United States Patent Office 3,766,228
Patented Oct. 16, 1973

3,766,228
PROCESS FOR THE PRODUCTION OF A STRAIGHT-CHAIN ALIPHATIC-ALPHA-HYDROXYCARBOXYLIC ACID
Gerhard Stern, Walter Müller, and Ferdinand Weinrotter, Linz (Danube), Austria, assignors to Osterreichische Stickstoffwerke Aktiengesellschaft, Linz (Danube), Austria
No Drawing. Filed Aug. 31, 1971, Ser. No. 176,702
Int. Cl. C08h 17/36
U.S. Cl. 260—413    7 Claims

ABSTRACT OF THE DISCLOSURE

The preparation of straight-chain, aliphatic α-hydroxycarboxylic acids by the saponification of α-nitratocarboxylic acids which comprises carrying out the saponification of the α-nitratocarboxylic acid with a neutral aqueous solution of an alkali metal salt of the α-nitratocarboxylic acid, produced by simultaneous introduction of the acid and of the alkali into previously introduced water, and the addition of alkali during saponification is so controlled that only after the bulk of the acid is saponified is the pH value of 9 exceeded.

This invention relates to a process for the production of straight-chain aliphatic α-hydroxycarboxylic acids.

Straight-chain, aliphatic α-nitratocarboxylic acids having at least five carbon atoms, whose preparation is disclosed in Austrian patent specification No. 254,160, have hitherto only been successfully saponified to the corresponding α-hydroxycarboxylic acids under the influence of alkali metal sulphite or alkali metal bisulphite (see Austrian patent specification No. 260,200). This process is however expensive and involved as a result of the nature and amount of the chemicals to be employed.

An obstacle to the saponification of such long-chain nitratocarboxylic acids by means of alkali is that in an alkaline medium these acids form α-ketocarboxylic acids, so that, at the very least, mixtures of α-hydroxycarboxylic acids and α-ketocarboxylic acids are obtained. The controlled manufacture of α-keterocarboxylic acids by treatment of α-nitratocarboxylic acids with two equivalents of 15 to 25% strength alkali metal hydroxide at temperatures between 80° and 100° C. is described in Austrian patent specification 273,062.

In the saponification of α-nitratolactic acid to lactic acid Austrian patent specification 283,301 has disclosed that an alkaline saponification without the formation of pyruvic acid is possible if the aqueous alkali solution is added in such amounts that the pH of the reaction solution is kept between 1 and 3.

This process is not applicable to straight-chain, aliphatic α-nitratocarboxylic acids having at least five carbon atoms since these, in contrast to nitratolactic acid, are not water soluble, and saponification does not occur under the conditions which are successful for lactic acid.

It has now been discovered that it is possible to saponify straight chain α-nitratocarboxylic acids having at least five carbon atoms with alkaline reagents, without significant amounts of α-ketocarboxylic acids being formed, if the saponification is carried out with neutral aqueous solutions of the alkali salt of the α-nitratocarboxylic acids and the addition of alkali during the saponification is so controlled that only after the bulk of the α-nitratocarboxylic acid has been saponified is the pH value of 9 exceeded. It is furthermore important that the solution of the alkali metal, preferably sodium, salt of the α-nitratocarboxylic acid should be produced by simultaneous introduction of the acid of the alkali into previously introduced water, that is to say that both an excess of said and an excess of alkali in the neutralisation solution are strictly avoided. The possibility of saponifying straight-chain aliphatic aliphatic α-nitratocarboxylic acids having at least five carbon atoms in this way is surprising, since in the saponification of nitratolactic acid under these conditions the formation of pyruvic acid would be unavoidable.

Accordingly the present invention provides a process for the production of a straight chain, aliphatic α-hydroxycarboxylic acid having at least five carbon atoms, or of a salt thereof, by saponification of the corresponding straight-chain, aliphatic α-nitratocarboxylic acids with at least two equivalents of alkali per mol of acid in an aqueous medium, which process comprises introducing the α-nitratocarboxylic acid uniformly and simultaneously with an amount of an aqueous solution of an alkali metal hydroxide or alkali metal carbonate which is at least sufficient for salt formation, into previously introduced water or into a previously introduced aqueous solution of the alkali metal salt of the acid, the pH of the mixture being kept between 5.5 and 8 during the introduction, maintaining the solution of the alkali metal, preferably sodium, salt of the α-nitratocarboxylic acid thus obtained at pH of between 5.5 and 9 by addition of further amounts of alkali metal hydroxide solution or alkali metal carbonate, at a temperature of between 80° C. and the boiling point of the solution and at atmospheric pressure or slightly elevated pressure, until the bulk of the nitrato-acid is saponified, and completing the saponification by the addition of a further amount of alkali metal hydroxide solution or alkali metal carbonate at the same temperature, and with the pH being greater than 9 after which the α-hydroxycarboxylic acid formed is subsequently precipitated from the reaction mixture as a neutral or acid salt which is sparingly soluble in water or is isolated, after acidification by extraction with an organic solvent in which the α-hydroxycarboxylic acid formed is soluble, and, if desired, subsequently liberating the free acid from the salt by acidification.

In order to carry out the process according to the invention it is possible first of all to produce the aqueous solution of the alkali metal, e.g. sodium, salt of the α-nitratocarboxylic acid under cold conditions, by simultaneously introducing the α-nitratocarboxylic acid and the amount of alkali required for the salt formation into previously introduced water or into the aqueous solution of the alkali metal salt which is being produced. The speed of introduction of the alkali should here be such that a pH of between 5.5 and 8, preferably between 6 and 7, is constantly maintained. Since for practical purposes saponification does not yet occur at this pH under cold conditions, it suffices at this point to employ only an amount of alkali sufficient for salt formation. However, according to a particularly preferred embodiment of the process according to the invention the alkali metal salt of the α-nitratocarboxylic acid is produced at the particular temperature at which the saponification subsequently also takes place. In this process variant it is unavoidable that saponification occurs simultaneously to a certain degree, but this saponification is slight compared to the neutralisation reaction. Nevertheless, this situation must be taken into account in that the amount of alkali employed for the manufacture of the alkali metal salt must be somewhat more than the amount theoretically necessary for the manufacture of this salt. This means that for the conjoint introduction of acid and alkali in this process variant more alkali, for example 10 to 40% more than 1 equivalent, must be provided, the amount and speed of addition being determined by strict checking of the pH, which must be kept between 5.5 and 8, preferably between 6 and 7. The amount of alkali required, after salt formation has taken place, for saponifying the bulk of the nitratocarboxylic acid at pH values below 9 is then correspondingly less. The total amount of alkali must be so chosen that after completion of the saponification at pH values above 9 a slight excess, for example 10% excess, of alkali has been added over the theoretically required 2 equivalents per mol of acid. The concentration of the alkali metal hydroxide solution or of the alkali metal carbonate solution should appropriately be between 10 and 20% by weight.

It is particularly advantageous if during the saponification of the bulk of the α-nitratocarboxylic acid the pH does not exceed 8. In some cases it is advisable to work under a slightly excess pressure, for example between 1 and 5 atmospheres, since as a result the reaction temperature may be increased, which may favour the course of the reaction.

The α-hydroxycarboxylic acid formed by the saponification may be isolated after completion of the reaction and acidification of the reacting mixture, by extraction with an organic solvent in which the α-hydroxycarboxylic acid is soluble. The acid thus obtained admittedly contains all impurities which are present through side reactions which may occur, for example fatty acids as well as neutral compounds such as nitro compounds which may be removed by subsequent recrystallisation of the crude α-hydroxycarboxylic acid, for example from petrol or heptane. Ethers, higher ketones which are immiscible with water or halogenated hydrocarbons may for example, be mentioned as extraction agents.

A very advantageous form of purification is to precipitate the α-hydroxycarboxylic acid as a sparingly soluble neutral salt from the saponification solution. Such a salt may be, for example, an alkaline earth metal, e.g. calcium or barium, salt, a magnesium salt or a zinc salt. The precipitation is achieved simply by adding an easily water-soluble salt of these metals to the alkaline reaction mixture. Precipitation of the α-hydroxycarboxylic acid as an acid alkali metal salt, such as the acid sodium salt, proves particularly advantageous, and this is achieved if the reaction mixture is adjusted to a pH of between 4 and 7 by addition of mineral acid. This partial acidification by addition of mineral acid may be carried out at any desired temperature. It is advantageous to add the acid to the hot reaction mixture after completion of the saponification; the acid salt crystallises out from the reaction mixture on cooling and may be separated off in the usual manner. The α-hydroxycarboxylic acids which are obtained from the neutral or acid salts precipitated in this way are substantially purer than the acids obtained by acidification and extraction. They may be obtained in an even purer form if a solvent which is immiscible with water, in which the free fatty acids and neutral substances present as impurities are soluble and of which the density preferably differs substanitally from the aqueous phase, for example, carbon tetrachloride, chloroform or trichloroethylene, is stirred into the aqueous retaction solution before, during or after addition of the precipitating agent, but before separating off the salt, after which the precipitate is separated off in the usual manner. The solvent may be stirred either into the hot reaction mixture or only into the cold reaction mixture, the boiling point of the solvent of course having to be taken into account.

The free α-hydroxycarboxylic acid may be liberated from the salt thus obtained by acidification and isolated in the usual manner.

The process according to the invention is in principle applicable to all straight-chain, aliphatic α-nitratocarboxylic acids having at least five carbon atoms. In the case of acids with more than 18 carbon atoms, however, the yields are less and the acids are difficult to purify, so that the process is preferentially suitable for the manufacture of straight-chain, aliphatic α-hydroxycarboxylic acids having 5 to 18 carbon atoms.

Apart from pure α-nitratocarboxylic acids, crude α-nitratocarboxylic acids as well as a mixture of α-nitratocarboxylic acids having at least five carbon atoms, such as are obtained in the reaction of technical olefin mixtures with $N_2O_4$, also may be saponified in accordance with the present process.

The following examples illustrate the invention and the manner in which it may be performed.

EXAMPLE 1

100 g. of α-nitratocaprylic acid (0.488 mol) and 200 ml. of 10 percent strength by weight aqueous sodium hydroxide solution (0.544 mol of NaOH) are simultaneously run into an initially introduced 250 ml. of boiling water in such a way that the pH of the solution does not exceed 6. During this process, which requires about half an hour, the α-nitratocaprylic acid is converted into its sodium salt, and the saponification starts at the same time.

The mixture is then heated to the boil for a further 2½ hours and further saponified by continuous addition of sodium hydroxide (117 ml., 0.324 mol of NaOH) at a pH of 6. Thereafter the mixture is adjusted to pH 9 and saponified whilst adding a further 35 ml. of sodium hydroxide solution (0.098 mol.). This process requires a further 2 hours.

The mixture is now additionally boiled for ½ hour at a pH of above 9, with the addition of 20 ml. of sodium hydroxide solution (6% excess), in order to react the last remnants of nitratocaprylic acid.

To precipitate the α-hydroxycaprylic acid produced, 48 ml. of 20% strength by weight sulphuric acid are added to the hot reaction mixture until a pH of 5.5 is reached, and the whole is left to cool. 100 ml. of carbon tetrachloride are then added and the mixture is stirred for 30 minutes and centrifuged. 67 g. of pure acid sodium salt of α-hydroxycaprylic acid are obtained.

EXAMPLE 2

50 g. (0.191 mol) of α-nitratododecanoic acid are saponified with 150 ml. (0.416 mol of NaOH) of 10% strength by weight aqueous sodium hydroxide solution, as described in Example 1.

After conclusion of the saponification the reaction mixture is cooled, acidified with sulphuric acid and extracted with ether. After evaporation of the ether, 36 g. of a solid product are obtained which on analysis, (column chromatography on silica gel) shows an 82% by weight content of α-hydroxydodecanoic acid.

The α-hydroxydodecanoic acid may be further purified by recrystallisation from n-heptane.

EXAMPLE 3

20 g. of α-nitratohexadecanoic acid (0.0631 mol) in the form of a solution in ether are converted into the sodium salt by means of 22 ml. of 10% strength by weight sodium hydroxide solution (0.063 mol of NaOH) by simultaneously introducing the solutions into an initially introduced 300 ml. of cold water, whilst maintaining a pH of 6. The mixture is then heated to the boil, whereupon the ether evaporates, and is saponified for five hours at 140° C. and a pH of 7 to 8 through further addition of sodium hydroxide solution (22 ml., i.e. say 0.0631 mol, of NaOH). Finally a further 4 ml. (0.0126 mol) of sodium hydroxide solution are added and the saponification is completed at a pH above 9. The alkaline solution is strongly acidified after cooling and then extraced with ether, and the ether is evaporated. 16 g. of end product (containing 74% by weight of α-hydroxyhexadecanoic acid) are obtained. The α-hydroxyhexadecanoic acid may be further purified by recrystallisation from petroleum ether.

What we claim is:

1. In a process for the production of a compound selected from the group consisting of straight-chain, aliphatic α-hydroxycarboxylic acids having 5 to 18 carbon atoms and their acid alkali salts by saponification of the corresponding straight-chain aliphatic α-nitratocarboxylic acid having 5 to 18 carbon atoms with at least two equivalents of an alkaline reagent per mol of acid in an aqueous medium, the improvement which comprises introducing the α-nitratocarboxylic acid uniformly and simultaneously with an aqueous alkaline solution selected from the group consisting of aqueous alkaline metal hydroxide solution and aqueous alkali metal carbonate solution, the amount of alkali present in the aqueous alkaline solution being at least sufficient for forming the salt of the α-nitratocarboxylic acid, into an aqueous medium selected from the group consisting of water and an aqueous solution of the alkali metal salt of the α-nitratocarboxylic acid, maintaining the resulting solution of the alkali metal salt of the α-nitratocarboxylic acid at a pH of between 5.5 and 9 by addition of further aqueous alkaline solution at a temperature in the range of from 80° C. to the boiling point of the reaction solution and a pressure in the range of from atmospheric pressure to slightly elevated pressure until the bulk of the α-nitratocarboxylic acid is saponified, completing the saponification by the addition of further aqueous alkaline solution at the same temperature in order to adjust the pH to above 9, and either (1) acidifying the reaction medium to a pH of below 4 and extracting the α-hydroxycarboxylic acid from the acidified mixture with an organic solvent in which the acid is soluble, or (2) acidifying the reaction medium to a pH of 4–7 by addition of mineral acid and precipitating the acid alkali salt of the α-hydroxycarboxylic acid from the acidified mixture.

2. A process according to claim 1 in which the conjoint introduction of the aqueous alkaline solution and the α-nitratocarboxylic acid is carried out at ambient temperature and the resulting aqueous solution of the alkali metal salt of the α-nitratocarboxylic acid is saponified, after heating to the reaction temperature, by further addition of the aqueous alkaline solution in an amount such that the alkali being present in the solution is sufficient for salt formation for the neutralisation of the α-nitratocarboxylic acid.

3. A process according to claim 1, in which the conjoint introduction of the aqueous alkaline solution and the α-nitratocarboxylic acid is carried out at a temperature within the range of 80° C. to the boiling point of the mixture, using the aqueous alkaline solution in an amount which represents an excess relative to salt formation and is sufficient to keep throughout the duration of the neutralisation reaction the pH of the reaction solution within the range of 5.5 to 8, after which the saponification is continued by continuous addition of the further amount of the aqueous alkaline solution while maintaining the pH of the reaction mixture within the range of 5.5 to 9, and is completed by addition of the further amount of the aqueous alkaline solution to exceed a pH of 9.

4. A process according to claim 1, in which the alkali metal used in the aqueous alkaline solution is sodium.

5. A process according to claim 1 in which the α-hydroxycarboxylic acid is separated from the reaction solution by precipitation as an acid alkali metal salt by addition of a mineral acid to the hot reaction mixture until a pH within the range of 4 to 7 is reached and the acid alkali metal salt is allowed to crystallize on cooling.

6. A process according to claim 5 in which before, during or after addition of the precipitant, but before the separating off the salt, an organic solvent selected from the group consisting of carbon tetrachloride, chloroform and trichloroethylene is added to the reaction mixture while stirring.

7. A process according to claim 1 in which a mixture of straight-chain aliphatic α-nitratocarboxylic acids having 5 to 18 carbon atoms is employed for the reaction.

References Cited
UNITED STATES PATENTS

| | | | |
|---|---|---|---|
| 2,847,453 | 8/1958 | Gardner et al. | 260—466 |
| 3,449,385 | 6/1969 | Müller et al. | 260—413 |
| 2,816,921 | 12/1957 | Gardner | 260—535 |
| 2,847,465 | 8/1958 | Robertson et al. | 260—533 |
| 2,993,921 | 7/1961 | Meyer | 260—413 |

LEWIS GOTTS, Primary Examiner

E. G. LOVE, Assistant Examiner

U.S. Cl. X.R.

260—535 R